United States Patent Office 3,540,978
Patented Nov. 17, 1970

3,540,978
ABRASION RESISTANT LAMINATES
AND COATING THEREFOR
Harold R. Ames, Munising, Mich., assignor to Kimberly-Clark Corporation, Neenah, Wis., a corporation of Delaware
Filed Nov. 8, 1967, Ser. No. 681,342
Int. Cl. B32b 5/16, 19/00
U.S. Cl. 161—162                 11 Claims

ABSTRACT OF THE DISCLOSURE

A sheet component and coating material for use in fabricating abrasion resistant decorative laminates in which the wearing surface consists of a cured thermosetting acrylic coating having tiny glass spheres called microbeads dispersed therethrough.

BACKGROUND OF THE INVENTION

Resin-impregnated decorative laminates are well known and have found wide use as surfacing materials for kitchen counters, sinks, tables, desks, furniture, walls, plywood, hardboard, particle board, metal and the like, and find ever-increasing applicatitons in both commercial and home areas. While the product has been improved greatly during its many years of development and use, the property of abrasion resistance has not been as satisfactory as described with respect to some types of product. Acrylic resins, for example, would make an ideal surface coating for decorative laminates because of the unusual resistance such resins have against the deteriorating effects of sunlight, heat and weathering. However, since acrylics generally have very poor abrasion resistance they have not been used to any great extent in laminates where high abrasion resistance is required. The present invention is directed toward overcoming the latter disadvantage.

The construction of conventional decorative laminates may generally be described as comprising: (1) a surface or wearing layer; (2) a print or decorative patterned layer; and (3) a supporting substrate or core layer. These layers are laminated together under heat and pressure to provide the decorative laminate. We are here concerned primarily with the surface, or wear, layer. The most common surface layer for decorative laminates has been a sheet of translucent overlay paper of alpha-cellulose or purified viscose rayon fibers impregnated with a thermosetting resin, usually a melamine-formaldehyde. When the above layers, in combination with thermosetting resins, which function as impregnants or glue lines, are pressed together and cured at elevated temperatures and high pressures a very attractive smooth-surface laminate is formed. However, as indicated previously, the surfaces of such unmodified conventional products generally have poor abrasion resistance.

Attempts have been made to improve abrasion resistance by incorporating hard siliceous materials such as silica flour, glass fibers, asbestos, or frit in the surface coating or wear layer. For example, U.S. patent 3,135,643 teaches replacing the overlay paper which generally comprises the wearing surface with a coating applied to the print layer in the form of a composition consisting of a thermosetting resin, silica flour and finely divided fibers having a refraction index approximating that of the cured resin. U.S. patent 3,123,515 teaches the use of frit and alpha cellulose fibers in a melamine-formaldehyde resin body to produce a hard abrasion resistant surface in holded products. In each of these patents it was found necessary to include in the thermosetting resin forming the surface coating a substantial quantity of fibers, primarily to prevent crazing. The teachings in these patents thus solve some of the problems involved in achieving abrasion resistance for the more commonly used resins but for unknown reasons these teachings were not found to be applicable to acrylic resins.

The present invention overcomes these disadvantages and provides an improved abrasion resistant coating when thermosetting acrylic resins are used as the surfacing material for decorative laminates.

SUMMARY OF THE INVENTION

In one embodiment of the present invention, the print sheet having the desired decorative pattern printed thereon is impregnated with a thermosetting acrylic resin. The impregnated sheet is then coated on the print side with a mixture comprising the same thermosetting acrylic resin with glass microbeads dispersed therein. A glue line or bond coat of the same resin is applied to the reverse side of the sheet and the sheet is then ready for application to a suitable substrate for pressing and curing. The resulting laminate has a smooth surface, high clarity, a velvety finish, and considerably improved abrasion resistance when compared to decorative laminates employing unmodified acrylic coatings.

It is the principle object of this invention to provide a sheet component for use in fabricating decorative laminates having an acrylic resin wearing surface with improved abrasion resistance.

Another object is to provide decorative laminates having an acrylic wearing surface with improved abrasion resistance.

An additional object is to provide an improved thermosetting acrylic coating for decorative laminates.

Other objects and advantages of the invention will be understood by reference to the following specification and accompanying drawing wherein there is described and illustrated selected forms of this invention.

DESCRIPTION OF THE PREFERRED EMBODIMENTS

Figure 1:
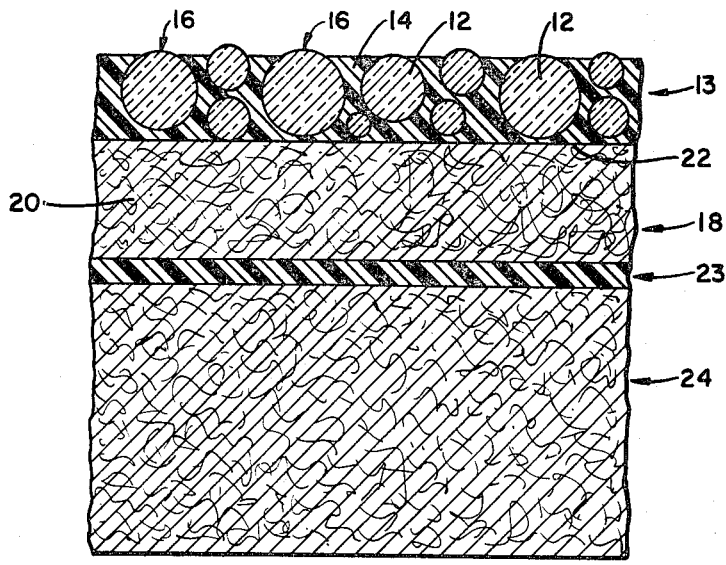
FIG. 1 is a greatly enlarged sectional view of one embodiment of the improved laminate of this invention.

Before describing preferred embodiments of the invention, a description of the preferred resins employed in the laminate is appropriate. As indicated previously, it is highly desirable to use clear, film-forming thermosetting acrylic resins in the wearing surface of decorative laminates and as the saturant for the print sheet in such laminates, because of the known resistance acrylic resins have to heat and light ageing. Various thermosetting acrylic resins are known and usually comprise an aqueous emulsion containing a mixture of (1) a copolymer of (a) at least one monomer selected from the group consisting of styrene, vinyltoluene, acrylonitrile, and acrylic and methacrylic acid alkyl esters in which the alkyl group contains from 1 to 8 carbon atoms and (b) a monomer selected from the group consisting of acrylamide or methacrylamide, and the formaldehyde reaction products of said amides including methylol and methoxymethyl derivatives, with (2) a water-soluble thermosetting aminoplast and (3) a volatile tertiary amine. Preferably, but not necessarily the mixture may also include an additive which is a dispersant in the form of an amine or ammonium salt of a polymeric carboxylic acid.

Suitable water-soluble thermosetting aminoplasts include the methylol derivatives of urea, cyclic ethylene urea, cyclic propylene urea, thiourea, cyclic ethylene thiourea, melamine, alkyl melamines, aryl melamines, guanamines, alkyl guanamines, aryl guanamines and mixtures thereof.

A preferred class of water-soluble aminoplasts are the condensates of formaldehyde and the reaction products of urea and melamine with a lower alkanol, such as methanol. These condensates are heat-convertible to insoluble cross-linked polymers. The condensates of methoxymethylureas and formaldehyde are particularly suitable.

Typical volatile tertiary amines are the trialkylamines containing 3 to 12 carbon atoms, triethanolamine, and N-methylmorpholine. Triethanolamine and triethylamine are particularly suitable.

For the dispersant, the ammonium and lower amine salts of polyacrylic and polymethacrylic acids and similar salts of the polymeric acid obtained by copolymerizing methyl vinyl ether with maleic anhydride are suitable.

A coalescent such as isophorone, 2-ethyl-hexanol, or tributyl phosphate may also be added to aid fusion of the resin.

The particular resin used as the wear coating and saturant in the examples described below is a clear polymeric film-forming acrylic resin of the aqueous emulsion type which comprises about 100 parts of a 48% solids deionized emulsion of a methyl methacrylate ethyl acrylate-methacrylamide copolymer in the ratio of about 52.5:42.5:5.0 respectively, mixed with about 15 parts of an 80% solids aqueous solution of an aminoplast consisting of a methylated melamine formaldehyde resin, and with about 1 part of triethylamine. Five parts of a coalescent, in this case isophorone, are also used. A dispersant, the ammonium salt of a maleic anhydride-diisobutylene copolymer with a number average molecular weight of 3000, is also added in the amount of about 5.5 parts of a 22% solids aqueous solution. Other known combinations may also be used.

The tiny glass beads employed in the wear surface coating are of microscopic size. In their dry condition these beads have the appearance of a fine white powder when viewed with the unaided eye. However, under a microscope they are easily identifiable as clear transparent spheres or glass beads. The beads used in the described examples have a size ranging from 10 to 210 microns and are non-specular in the finished product. Beads up to about 105 microns in size are preferred in smooth surfaced products. Bead sizes up to 210 microns and more, may be used in cases where it is desired to impart texture.

EXAMPLE 1

In a preferred embodiment a conventional print sheet of bibulous paper having a basis weight of 28 lbs. per 17" x 22" 500 sheet ream, and having a decorative pattern printed on one side was impregnated with an aqueous emulsion of the above-described thermosetting acrylic resin containing about 25% solids. The saturant was applied to the base sheet in sufficient amount to retain about 35 parts of resin solids by weight per hundred parts of fiber. The saturated sheet was then dried and coated on the print side with an aqueous emulsion containing a blend of equal dry parts of the same thermosetting acrylic resin used to saturate the sheet and microscopic-sized glass beads hereinafter referred to as glass microbeads. The microbeads employed in this example had a diameter ranging from about 10 to 53 microns, a size designated as Microbeads MS–XL by the supplier. The coating was applied in the amount of 23 lbs. by weight per ream based on dry solids. A bond coat of the same acrylic resin in the amount of 8 lbs. per ream was applied to the reverse side of the print sheet and the sheet was then laminated to a particle board substrate in a hot press for about 6 minutes at about 300° F. and about 300 p.s.i. The resulting laminate had a smooth attractive surface with the printed pattern showing through the coating without distortion or lack of clarity. The microbeads in the coating are not visible when viewed by the unaided eye but are readily discernible when viewed thru a microscope. As seen thru the microscope a large number of the beads may be seen protruding slightly thru the cured resin surface. Even though these beads protrude, the coating was found to be non-specular.

A similar laminate was also prepared except that the surface coating did not contain microbeads. This laminate had a shinier surface than the microbead-containing product and the decorative portion did not appear to have the depth apparent in the microbead-containing product.

The two laminates were then tested on a Taber Abrader for abrasion cycles and abrasion rates in accordance with the standards of the National Electrical Manufacturers Association (NEMA) test LP–1.06, with the following results.

| Laminate tested | Abrasion cycles | Weight loss per 100 cycles, grams |
|---|---|---|
| (1) With glass beads | 575 | .0413 |
| (2) Without glass beads | 310 | .0658 |

The abrasion cycles are the number of cycles necessary for the breakthrough of an abrasive covered wheel to occur when in contact with the test sample, at which point in the test the underlying print surface is abraded.

Abrasion rate is a measure of the number of grams of sample abraded off per hundred revolutions of the abrading wheel.

The NEMA standard specification for minimum value (abrasion cycles) is 400. The NEMA specification for maximum abrasion rate is .08 gram/100 revolutions.

The abrasion rates for standard laminates having melamine resin wear surfaces are rarely below .060 to .065. It will be noted that this rate is in the same range as the unmodified thermosetting acrylics set forth above.

It will also be seen that the unmodified acrylic wear coating does not meet the NEMA minimum wear value, but that the coating with the glass beads is well above the established minimum.

The weight-loss for the coating containing the microbeads is also considerably less than the weight-loss for the coating without the beads.

EXAMPLE 2

In another example, a print sheet having a basis weight of 41 lbs. per ream was impregnated with the same acrylic resin saturant in an amount to retain 70 parts solids per 100 parts fiber. The saturated sheet was then coated with an aqueous emulsion containing 50% by weight of acrylic resin solids and 50% by weight of microbeads having a diameter ranging from about 53 to 105 microns, a size designated as Microbeads MS–ML by the supplier. The coating was applied in the amount of 23 lbs. by weight per ream. An 8 lb. bond coat of the same acrylic resin was also applied to the reverse side of the sheet.

This sheet was then laminated to a sheet steel substrate in a hot press for about 8 minutes at about 290° F. and about 200 p.s.i.

The resulting laminate was tested in a Taber Abrader with the following results: Abrasion cycles, 633; Weight loss per 100 cycles, .0353 gram.

EXAMPLE 3

In still another example, a print sheet having a basis weight of 28 lbs. per ream was impregnated with the previously described acrylic resin saturant in an amount to retain 35 parts solids per 100 parts fiber. The saturated sheet was then coated with an aqueous emulsion containing 50% by weight of acrylic resin solids and 50% by weight of microbeads having a diameter ranging from about 105 to 210 microns, a size designated as Microbeads MS–MH by the supplier. The coating was applied in the amount of 23 lbs. per ream. An 8 lb. bond coat of the acrylic resin was also applied to the reverse side of the sheet.

This sheet was then laminated to a hardboard substrate in a hot press for about 6 minutes at about 300° F. and about 300 p.s.i.

The finished product had a matte finish with a textured pebbly grain. Taber Abrader tests gave the following results: Abrasion cycles, 633; Weight loss per 100 cycles, .0264.

It will be noted that as the size of the microbeads are increased the abrasion resistance as measured by abrasion cycles and weight loss also increases.

It will also be noted that for smooth-surfaced products, microbead sizes of 105 microns or less are preferred. The actual surface finish when beads of such size are used is not glossy, as is the case in the absence of beads, but has a sort of velvety finish. When a wood-grain pattern is used in the print sheet, the resulting product resembles natural wood with a hand-rubbed surface and appears to provide considerable depth in the grain pattern.

In addition to being useful for providing an abrasion resistant surface for laminates in which a decorative print sheet is utilized, the invention has been found useful in providing abrasion resistance for paint base overlays. The latter are sometimes known as medium density overlays in the industry, and are used most commonly for lamination to various fibrous substrates. These overlays can be hot pressed or roll laminated. The finished products are used on cupboard door backs, shelving, interior closet surfaces, exterior siding and the like. In making these overlays, bleached kraft fibers are used in the base sheet, which usually is of a basis weight of from 15 to 36 lbs. per ream, and is impregnated with a resin saturant in the amount of 35 to 100 parts solids per 100 parts fiber. In making paint base overlays, the base sheet is not printed, but an overall color is obtained by adding pigment in the surface coating in the amount of 10 to 40 parts pigment per 100 parts of resin. The addition of microbeads to the pigmented coating provides abrasion resistance in the desired range.

EXAMPLE 4

One specific example of such an abrasion resistant paint base overlay is as follows: A 25# unbleached hardwood kraft sheet was impregnated with the previously described acrylic resin in the amount of 40 parts resin solids per 100 parts fiber. About 14 parts of clay filler were also added in the saturant to help provide opacity in the base sheet. The saturated sheet was then coated with an aqueous emulsion containing 40% by weight of acrylic resin solids, 40% by weight of microbeads in the 10 to 55 micron size, and 20% green pigment. A 9 lb. bond coat of acrylic resin was then applied to the reverse side.

This sheet was laminated to a hardboard substrate in a hot press for about 6 minutes at 300° F. and 300 p.s.i.

A similar paint base overlay was prepared and laminated without using microbeads in the surface coating. Both products were then tested with the Taber Abrader with the following results:

| Paint base overlay laminate tested | Abrasion cycles | Weight loss per 100 cycles, grams |
|---|---|---|
| (1) With glass beads | 342 | .0514 |
| (2) Without glass beads | 172 | .0802 |

Paint base overlays need not meet the NEMA standards since their end uses are far less demanding. Nevertheless it will be noted that the example in which microbeads are used is well under the NEMA maximum weight loss requirement and approaches very closely the NEMA minimum abrasion cycle requirement. When larger beads were used, it was found that the latter requirement was also exceeded.

Since paint base overlays generally are designed to be competitive with lower cost products than the earlier-described decorative laminates, it is preferred that the ingredients used in their construction be as inexpensive as possible. In an effort to improve costs over an all-acrylic treated sheet, it was found that the acrylic resin in the base sheet can be replaced by a less expensive film-forming resin comprising 100 parts polyvinyl acetate and 50 parts phenolic resin. While polyvinyl acetate is normally highly thermoplastic when used by itself, it was found that when mixed with phenolic resin the mixture very closely proximates the thermosetting characteristic of the acrylic for which it is substituted. The cost of the bond coat can also be reduced by including some phenolic resin and clay filler in the formula.

A typical lower cost construction for paint base overlays is as follows:

Base sheet: Unbleached hardwood kraft with a basis weight of 15 to 36 pounds per 17" x 22" 500 sheet ream.

| Saturant formulation: | Dry parts |
|---|---|
| Polyvinyl acetate | 100 |
| Phenolic resin | 50 |
| Clay | 50 |

Saturant pick-up: 40–80 parts per 100 parts fiber

| Abrasion resistant coating formulation: | Dry parts |
|---|---|
| Acrylic resin | 100 |
| Pigment | 20 to 40 |
| Microbeads | 100 |

Coating thickness: 2 to 8 mils

| Glue line formulation: | Dry parts |
|---|---|
| Acrylic resin | 100 |
| Phenolic resin | 30 |
| Clay | 35 |

Glue line weight: 4½ to 9 lbs. per ream.

Now referring to the drawings, FIG. 1 shows a greatly enlarged sectional view of one embodiment of a finished laminate made in accordance with the invention. Microbeads 12 are shown embedded in the cured acrylic coating 14 to form wear layer 13. A small portion 16 of the top of some of the microbeads protrude through the surface of coating 14, but these are not visible to the unaided eye. In addition, these minute protrusions cannot be detected by touch. Thus, for all intents and purposes, the surface is smooth and unblemished as far as the visible and tactile properties are concerned.

The print layer 18 comprises a resin-impregnated fibrous sheet 20 with a patterned or colored print side 22 protected by the wear surface layer 13. Print layer 18 in turn is adhered to the substrate or core layer 24 by a bond layer or glue line 23. Core layer 24 may be fibrous as shown, i.e., particle board, multiple layers of phenolic-impregnated paper, plywood, etc.; or non-fibrous, i.e. steel, glass, aluminum, etc.

Figure 2:
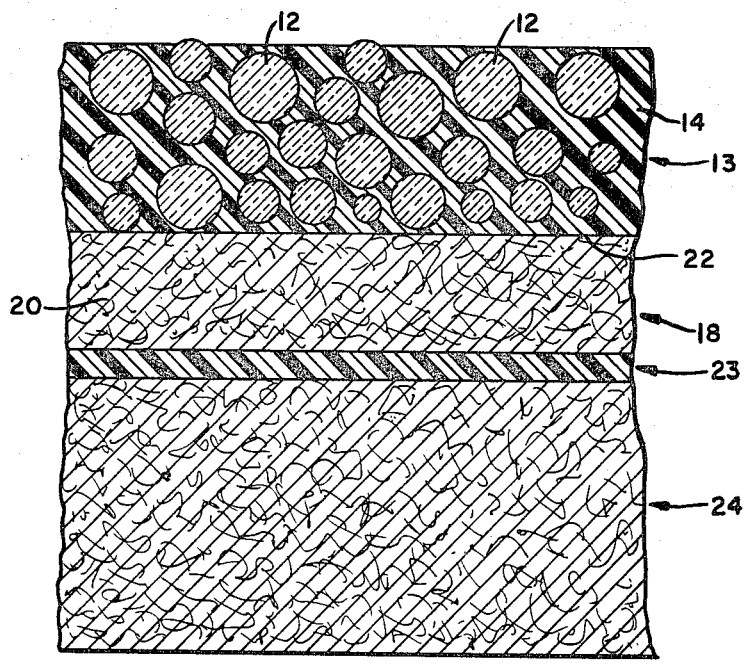
FIG. 2 is another greatly enlarged sectional view showing an embodiment with a thicker wear layer in accordance with the invention.

In FIG. 2 a similar arrangement is shown wherein microbeads 12 are likewise embedded in the cured surface coating 14, but the latter is much thicker and several layers of microbeads are present as filler. Otherwise the laminate is the same as in FIG. 1 with a print layer comprising a resin-impregnated sheet 20 with a printed side 22, a glue line 23, and a core 24.

Figure 3:
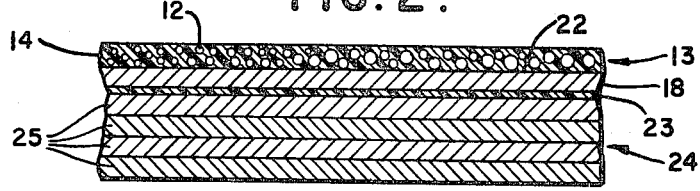
FIG. 3 is a smaller sectional view of the improved laminate employing a multilayered core.

FIG. 3 is a smaller sectional view of a laminate in which the core comprises multiple layers of phenolic-impregnated paper 25.

The improved coating may be employed in both high pressure and low pressure laminate. High pressure laminates are generally considered to be those pressed under pressures of from 600 to 1500 p.s.i. Low pressure laminates being those pressed at betwen about 250 to 350 p.s.i. as in the above examples.

Both clear and colored microbeads may be used, but for most purposes the clear beads are preferred since they do not have any adverse effects on the final decorative effect. Hollow microbeads may also be used, if sufficiently strong to prevent fracture during handling and pressing.

It is also important that the glass beads be substantially spherical and smooth-surfaced. Silica flour and frit, for example, are not satisfactory since they are highly abrasive in nature, especially when in the size range of the microbeads found desirable for use in this invention. Such fillers also have been found to abrade the press pans or caul plates in the laminating press, and do not lend themselves to use in conventional coating equipment. Microbeads, on the other hand, are smooth enough to act as miniature ball-bearings in the coating emulsion and permit the use of roll coaters, blade coaters, rod coaters and the like without deleterious effect on the coating equipment. For the same reason microbeads do not have an abrasive effect on the press pans or caul plates in the laminating press.

A coating thickness of about 2 mils is satisfactory for most uses, but coatings as thick as 8 mils and higher have been found equally satisfactory.

It is also preferred that the coating be approximately as thick as the maximum bead diameter used, whereby a substantial number of the beads protrude slightly through the surface coating. These protruding beads are not visible to the unaided eye, nor are they able to be felt by touch. However, they do contribute greatly to the desired abrasion resistance.

What is claimed is:

1. A sheet component for use in fabricating decorative laminates with improved abrasion resistance said sheet comprising a bibulous fiber web layer impregnated with a thermosetting film-forming resin and having coated on its upper surface a non-fibrous layer comprising a thermosetting acrylic resin having glass microbeads dispersed uniformly therethrough.

2. The sheet component of claim 1 having a bond coating on its bottom surface comprising a thermosetting acrylic resin.

3. The sheet component of claim 1 in which said film-forming resin and said acrylic resin comprises a mixture of (1) a copolymer of (a) at least one monomer selected from the group consisting of styrene, vinyltoluene, acrylonitrile, and acrylic and methacrylate acid alkyl esters in which the alkyl group contains from 1 to 8 carbon atoms and (b) a monomer selected from the group consisting of acrylamide or methacrylamide, and the formaldehyde reaction products of said amides including methylol and methoxymethyl derivatives, with (2) a water-soluble thermosetting aminoplast and (3) a volatile tertiary amine.

4. The sheet component of claim 1 in which said microbeads range in size from about 10 to about 210 microns.

5. The sheet component of claim 1 in which said film-forming resin comprises a mixture of polyvinyl acetate, phenolic resin and clay, said acrylic resin comprises a mixture of (1) a copolymer of (a) at least one monomer selected from the group consisting of styrene, vinyltoluene, acrylonitrile, and acrylic and methacrylic acid alkyl esters in which the alkyl group contains from 1 to 8 carbon atoms and (b) a monomer selected from the group consisting of acrylamide or methacrylamide, and the formaldehyde reaction products of said amides including methylol and methoxymethyl derivatives, with (2) a water-soluble thermosetting aminoplast and (3) a volatile tertiary amine, and said coating also contains a pigment.

6. The sheet component of claim 5 having a bond coating on its bottom surface comprising a mixture of said acrylic resin, phenolic resin, and clay.

7. An abrasion resistant decorative laminate comprising a substrate, and attached to said substrate by a cured thermosetting acrylic binder layer a bibulous fiber web layer impregnated with a cured thermosetting film-forming resin, said impregnated web layer having coated on its surface a non-fibrous layer comprising a cured thermosetting acrylic resin having glass microbeads dispersed uniformly therethrough.

8. The laminate of claim 7 in which said film-forming resin and said acrylic resin comprises a mixture of (1) a copolymer of (a) at least one monomer selected from the group consisting of styrene, vinyltoluene, acrylonitrile, and acrylic and methacrylic acid alkyl esters in which the alkyl group contains from 1 to 8 carbon atoms and (b) a monomer selected from the group consisting of acrylamide or methacrylamide, and the formaldehyde reaction products of said amides including methylol and methoxymethyl derivatives, with (2) a water-soluble thermosetting aminoplast and (3) a volatile tertiary amine.

9. The laminate of claim 7 in which said microbeads range in size from about 10 to about 210 microns.

10. The laminate of claim 9 in which said microbead-containing coating is non-specular.

11. The laminate of claim 7 in which said film-forming resin comprises a mixture of polyvinyl acetate, phenolic resin and clay, said acrylic resin comprises a mixture of (1) a copolymer of (a) at least one monomer selected from the group consisting of styrene, vinyltoluene, acrylonitrile, and acrylic and methacrylic acid alkyl esters in which the alkyl group contains from 1 to 8 carbon atoms and (b) a monomer selected from the group consisting of acrylamide or methacrylamide, and the formaldehyde reaction products of said amides including methylol and methoxymethyl derivatives, with (2) a water-soluble thermosetting aminoplast and (3) a volatile tertiary amine, and said coating also contains a pigment.

References Cited

UNITED STATES PATENTS

| | | | |
|---|---|---|---|
| 3,316,139 | 4/1967 | Alford et al. | 161—162 XR |
| 3,288,618 | 11/1966 | De Vries | 161—168 XR |
| 3,218,225 | 11/1965 | Petropoulos | 161—248 |

PHILIP DIER, Primary Examiner

U.S. Cl. X.R.

117—70, 161; 161—116, 165, 252, 263